April 29, 1941. T. S. CASNER Re. 21,786
SHAVING MACHINE
Original Filed Sept. 17, 1936
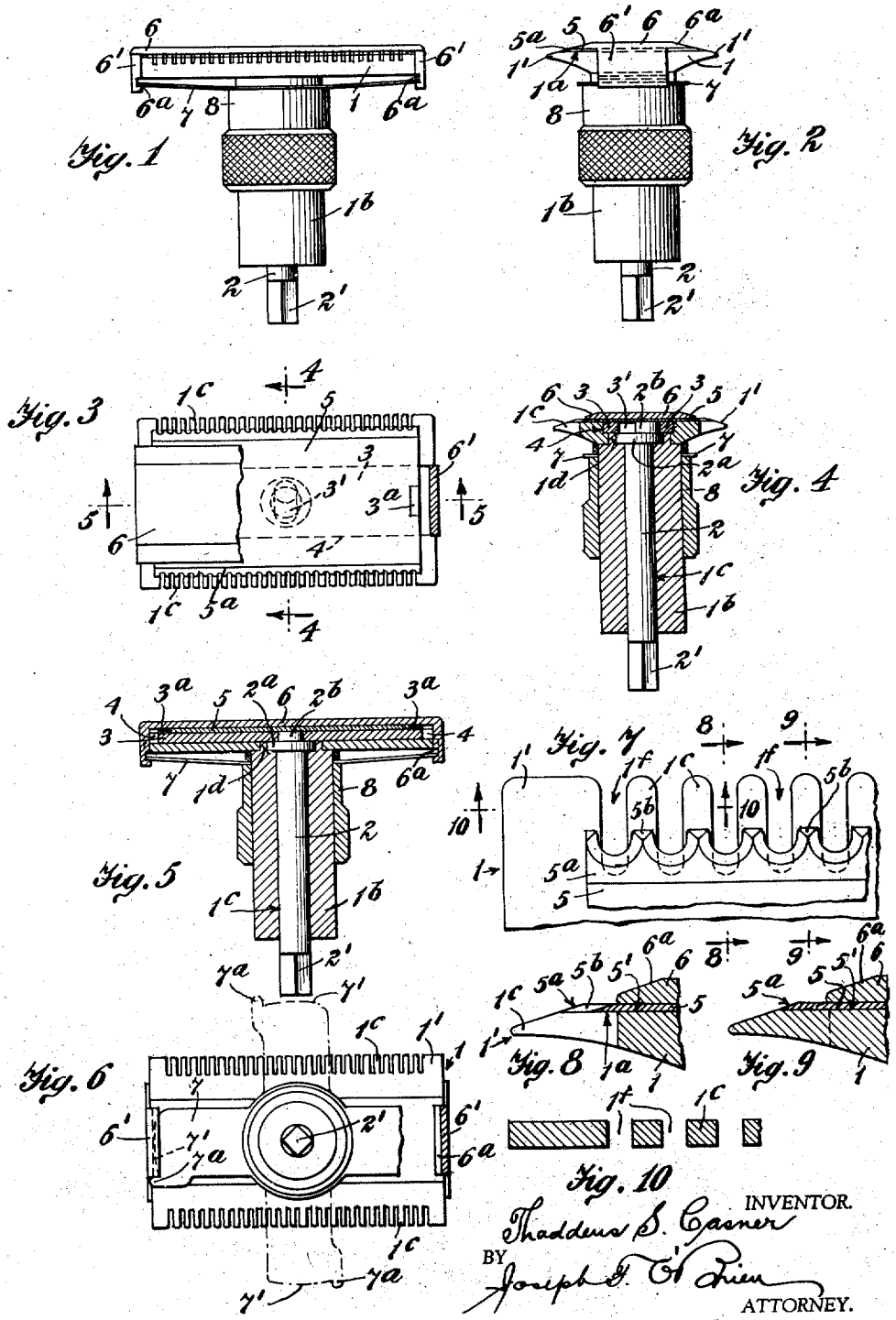
INVENTOR.
Thaddeus S. Casner
BY
Joseph D. O'Brien
ATTORNEY.

Reissued Apr. 29, 1941

Re. 21,786

UNITED STATES PATENT OFFICE 21,786

SHAVING MACHINE

Thaddeus S. Casner, Plainfield, N. J., assignor to Casner Patents, Inc., a corporation of Delaware Original No. 2,145,247, dated January 31, 1939, Serial No. 101,197, September 17, 1936. Application for reissue February 24, 1940, Serial No. 320,685

8 Claims. (Cl. 30—43)

This invention relates to improvements in shaving machines and particularly to shaving machines having cutting blades reciprocated across spaced teeth in a guard or comb member and preferably by an electric motor.

One of the objects of this invention is to provide a construction of shaving machine of the type specified in which a movable cutting blade will be reciprocated above or outside of the guard or comb portion and will have its cutting edge so positioned in relation to a skin-contacting edge of said guard or comb portion that the user will be enabled to shave closely without danger of cutting the skin, and to this end the blade is provided with a directly exposed cutting edge having a series of serrations formed with cutting edges and adjusted to cut upon lateral movement of the blade in relation to the comb portion. Preferably the portion of the blade adjacent its cutting edge is bevelled or similarly shaped and is combined with a comb having a skin-contacting inclined or bevelled guiding edge shaped to form with the inclined surface of said blade cutting edge a skin-contacting surface which is continuous except for the serrations of the blade and comb, whereby the outer portions of said cutting edge may be reciprocated in abutment with the skin to procure a close shave without cutting the face.

Another object of my invention is to provide an outside clamp member resiliently maintaining the elements in engagement, extending in a longitudinal direction parallel to the edge of the blade, and having a guiding edge inclined or shaped to form with the shaped edges of the blade and comb a skin-contacting surface which is continuous except for the serrations of the blade and comb, thus further protecting the face against cutting or injury by the blade.

Another object of my invention is to provide a shaving machine construction embodying a blade-holder that will be readily cleansable and may be used to shave hair from the skin either with or without a lather.

Another object of my invention is to provide a machine of the character specified which will be composed of a minimum number of simple parts and which will be capable of ready and quick assembly and dis-assembly through simple movements by unskilled persons.

With these and other objects in view, the invention comprises the combination of members and arrangement of parts so combined as to coact and co-operate with each other in the performance of the functions and the accomplishment of the results herein contemplated, and comprises in one of its adaptations the species or preferred form illustrated in the accompanying drawing, in which:

Fig. 1 is a view in side elevation of a shaving machine embodying my invention;

Fig. 2 is an end elevation of the machine shown in Fig. 1;

Fig. 3 is a top plan view of the machine shown in Figs. 1 and 2, a top clamping member being partially broken away;

Fig. 4 is a section on the line 4—4 of Fig. 3 looking in the direction of the arrows;

Fig. 5 is a section on the line 5—5 of Fig. 3 looking in the direction of the arrows;

Fig. 6 is the bottom plan view of my razor showing the bottom spring locking-plate and clamp member partially broken away;

Fig. 7 is an enlarged fragmentary view in top plan of a portion of the comb and cutting blade;

Fig. 8 is a section on the line 8—8 of Fig. 7 looking in the direction of the arrows;

Fig. 9 is a section on the line 9—9 of Fig. 7 looking in the direction of the arrows; and Fig. 10 is a section on the line 10—10 of Fig. 7 looking in the direction of the arrows.

Referring now to the drawing, which illustrates a preferred embodiment of my invention, 1 indicates a blade-supporting or holder member having a relatively thick body portion and provided at one or each of its longitudinal edges with a tapering comb portion 1′ having a series of comb teeth and interdental spaces extending at right angles to said edge. Said supporting member has on its upper face a blade-supporting surface $1^a$ and is fast on and extends transversely of a stationary cylindrical stem-member $1^b$ being connected with and extending through the bottom surface at the middle of said blade-supporting member to form a T-shaped structure therewith. Said stem-member has an axial bore $1^c$ and a seating depression $1^d$, for reception of a cam-operating shaft 2 and a collar $2^a$ fast on the upper end of said shaft 2, is disposed in said stem-member. Said collar is provided with a cam-member $2^b$ projecting above said collar-seating depression. The shaft 2 is provided at its lower end with a squared portion 2′ adapted to be inserted in a similarly-shaped socket of a motor (not shown) to cause rotation of the shaft. The cam-member $2^b$ fits within a transverse slot 3′ in an oblong reciprocating element 3 mounted within a depressed longitudinal groove 4 in the top surface of the blade-supporting member, the connection being such that the element 3 will be reciprocated longitudinally in said groove by a revolving movement of the cam $2^b$ when the shaft 2 is rotated. The reciprocating member 3 is provided with blocks $3^a$ or the like for connection with and reciprocation of a cutting blade 5 on the blade-supporting surface $1^a$. All the parts are resiliently clamped together by a clamp-member 6 which is provided at its opposite ends with depending flanges 6', 6' having locking grooves $6^a$, $6^a$ adapted to cooperate with a spring plate 7 mounted to swing about the stem-member $1^b$ into and out of locking engagement with the clamp plate 6 and, as shown, mounted by a fast connection on a hub member 8 swinging on said stem-member $1^b$ and by which the user may swing the hub member 8 and plate 7 into and out of locking engagement with the clamp plate. Said spring plate 7 is provided at the ends thereof with rounded groove-engaging edges 7' and also has projecting stop lugs $7^a$ extending from corners of such ends to prevent excessive turning of said spring lock-plate.

It will be seen from the above that I have provided an extremely simple holder mechanism for mounting a reciprocable blade and one that is capable of permitting a ready and quick fastening and release of the blade by an unskilled user, and it will be obvious that in a device of the character above specified the cutting or shaving will be accomplished along or at an outside or exposed skin-contacting surface which is continuous except for the serrations of the blade and comb and of which the bevelled or similarly shaped edge portion of the blade forms a part and without dirt-accumulating cavities and the application of the razor to the face will be in a manner very similar to the application of the conventional safety razor; that my device will be free from dirt or hair-collecting cavities and that the parts may be readily dis-assembled for cleaning and sterilizing and also that such dis-assembly and remounting may be accomplished by simple movements which are similar to those now employed for mounting conventional non-reciprocating safety razors.

An important feature of my invention comprises the combination, in my aforesaid mechanism, of a blade-supporting member having a comb portion which in the embodiment shown has similar tapering double edges and a top surface 1' providing a blade-supporting portion $1^a$ merging at each of its opposite sides with a pronged or toothed edge $1^c$ which is beveled in relation to the blade-supporting surface, with a cutting blade 5 which, in the embodiment shown, is a double-edged blade. The blade has a bottom surface 5' which is complementary to and engages the blade-supporting surface of the blade-supporting member; in the specific embodiment illustrated, both of these surfaces are substantially flat. The blade has on each side an edge portion $5^a$ which is bevelled or shaped to form with the similarly bevelled or shaped adjacent edge portions of the guard comb 1 and portions $6^a$ of the clamp-member 6 a skin-contacting surface which is continuous except for the serrations of the blade and comb and adapted in the shaving operation to be pressed directly against the skin to be shaved. Said beveled edge of the blade is provided with cutting serrations or teeth $5^b$ each comprising indentations preferably arcuate in linear conformation and provided with similarly beveled edge portions extending from the top to the bottom flat surfaces at a similar inclination. These cutting-teeth $5^b$ overlie portions of guarding-prongs $1^c$ on the comb member 1' separated by inter-prong-spaces $1^f$ and adapted, in the process of shaving, to receive and hold the hair to be cut between them but which are unsharpened and have no cutting function, such prongs being merely employed to retain, in upright position, the upper free portions of the hairs during the cutting operation by the cutter, the severing by the cutting edge taking place between the skin and such comb portions. It will be understood that the edges of the teeth of the cutting blade will be very sharp and that the reciprocating movement thereof will do the cutting so that the guard prongs need not be sharp and the function thereof is merely to support the outer portions of the hairs during the cutting of the same close to the face. I am thus enabled to produce a much closer shave than can possibly be obtained by the use of a mechanism which reciprocates above a comb member that engages the lower portion of the hair instead of the outer free portion thereof. It will be seen also, that because of the skin-contacting surface formed by the adjacent shaped edge portions of the guard comb 1, blade 5, and clamp 6, which is continuous except for the serrations of the blade and comb, the teeth of the blade will, in the operation of shaving, be positioned closely against the face of the user but that the user will, because of the guarding function of the comb member, be unable to cut his face unless he presses the same into the face very hard in a manner that would cause the ordinary safety razor also to produce a cut or chafing.

It will be understood that cutting edge of the blade 5 is resiliently maintained in engagement with the blade-supporting portion of the comb and that the skin of the user cannot be forced between these surfaces and also that the thickness of the metal of the blade is above the blade-supporting surface and said blade itself acts to slightly space the surface of the skin from the cutting edges which are reciprocated laterally against the spaces of the comb teeth.

The provision, on the clamp-member 6 of beveled or shaped edge surfaces $6^a$, which with the adjacent bevelled or shaped edge surfaces $5^a$ of the blade 5 and edge surfaces of the blade-supporting member 1 form a skin-contacting surface which is continuous except for the serrations of the blade and comb, also cooperate with the shaped edge surfaces of the comb portion 1' to guard the face of the user against injury, while permitting close access of the blade to the face for the purpose of enabling a close shave to be obtained.

It will be seen from the drawing and the above description, that applicant's blade is adapted to cut upon a lateral relative movement of such blade and the comb teeth $1^c$. These comb teeth are not sharpened and do not cooperate in a cutting or shearing action with the blade teeth, but on the contrary, the comb teeth are utilized as guiding elements and also to hold or retain the skin firm and the hairs in position while the sharp edge of the blade cuts such hairs in a manner similar to the cutting by a knife or by the edge of a razor blade and without appreciable, if any, shearing action between the edges of the comb-teeth and edges of the teeth of the blade.

Having described my invention, I claim:

1. A shaving machine embodying, in combination, a stationary blade-supporting member having a body portion provided at its top with a flat blade-supporting surface and an outwardly-projecting comb portion provided along a side of the top surface with a beveled edge merging with said flat surface, said comb portion being provided with a series of comb teeth and interdental spaces disposed at right angles to said edge and extending inwardly of said beveled edge portion and through a part of said flat blade-supporting portion, a blade having a flat bottom surface abutting the said flat surface of said supporting member and having a beveled edge extending along a side of the top surface and arranged at an acute angle with the bottom surface of the blade and with the said flat supporting surface, said outer beveled edge of the blade and the beveled edges of the comb teeth being disposed in the same inclined plane, said beveled edges of the comb and knife providing a beveled skin-contacting surface adapted in the shaving operation to be pressed against the face of the user, and said beveled edge of the blade being provided with a series of teeth having lateral edges similarly beveled and adapted to cut upon lateral movement of the blade in relation to said comb portion, means for clamping said members together, and power means for reciprocating said blade.

2. A shaving machine embodying, in combination, a stationary blade-supporting member having a body portion provided at its top with a flat blade-supporting surface and an outwardly-projecting comb portion provided along a side of the top surface with a beveled edge merging with said flat surface, said comb portion being provided with a series of comb teeth and interdental spaces disposed at right angles to said edge and extending inwardly of said beveled edge portion and through a part of said flat blade-supporting portion, a blade having a flat bottom surface abutting the said flat surface of said supporting member and having a beveled edge arranged at an acute angle with the bottom surface of the blade and with the said flat supporting surface, said outer beveled edge of the blade and the beveled edges of the comb teeth being disposed in the same inclined plane, and said beveled edge of the blade being provided with a series of teeth having lateral edges similarly beveled and adapted to cut upon lateral movement of the blade in relation to said comb portion, a clamping member having a clamping connection with said blade supporting member at opposite ends and having a beveled edge inclined in substantially the same plane as the beveled edges of the comb and blade, said beveled edges of the comb, blade and clamping member providing an aligned skin-contacting beveled surface adapted to contact, in the shaving operation, with the skin of the user, and power means for reciprocating said blade between said clamping member and comb.

3. A shaving machine embodying, in combination, a stationary blade-supporting member having a body portion provided with a flat blade-supporting surface and an outwardly-projecting comb portion provided with a beveled edge merging with said flat surface, said comb portion being provided with a series of comb teeth and interdental spaces disposed at right angles to said edge and extending inwardly of said beveled edge portion and through a part of said flat blade-supporting portion, a blade having a flat bottom surface abutting the said flat surface of said supporting member and having a beveled edge arranged at an acute angle with the bottom surface of the blade and with the said flat supporting surface, said outer beveled edge of the blade and the beveled edges of the comb teeth being disposed in the same inclined plane, and said beveled edge of the blade being provided with a series of teeth having lateral edges similarly beveled and adapted to cut upon lateral movement of the blade in relation to said comb portion, a clamping member having a clamping connection with said blade supporting member at opposite ends and having a beveled edge inclined in substantially the same plane as the beveled edges of the comb and blade, a spring locking member rotatably mounted at the side of said supporting member opposite to said clamping member and adapted to cooperate with the ends of said clamping member to resiliently lock the blade and comb members together, and means for reciprocating said blade.

4. A shaving machine embodying, in combination, a stationary blade-supporting member having a body portion provided with a flat blade-supporting surface and an outwardly-projecting comb portion provided with a beveled edge merging with said flat surface, said comb portion being provided with a series of comb teeth and interdental spaces disposed at right angles to said edge and extending inwardly of said beveled edge portion and through a part of said flat blade-supporting portion, a blade having a flat bottom surface abutting the said flat surface of said supporting member and having a beveled edge arranged at an acute angle with the bottom surface of the blade and with the said flat supporting surface, said outer beveled edge of the blade and the beveled edges of the comb teeth being disposed in the same inclined plane, and said beveled edge of the blade being provided with a series of teeth having lateral edges similarly beveled and adapted to cut upon lateral movement of the blade in relation to said comb portion, the bottom side of said supporting member at the edge thereof being undercut to provide elongated and pointed comb teeth, a spring locking member rotatably mounted at the side of said supporting member opposite to said clamping member and adapted to cooperate with the ends of said clamping member to resiliently lock the blade and comb members together, and means for reciprocating said blade.

5. A shaving machine embodying, in combination, a blade-supporting member having a relative thick middle portion with an upper flat blade-supporting surface and an edge portion pointed and provided with teeth to form a comb portion having a top surface partly flat and partly beveled, a cylindrical stem member attached to and projecting from the bottom surface of said middle portion to produce a T-shaped structure and having an axial bore, a shaft disposed within said axial bore and passing through said supporting member, said shaft being provided at its lower end with means for engagement with a motor and having at its upper end a blade-reciprocating cam, said supporting member being provided with a flat blade-contacting surface, a cutting blade provided with a flat surface abutting the flat surface of said supporting member and comb portion and having an operative connection with said cam, said comb portion and blade having beveled edge portions disposed in a similar inclined plane, a clamp-plate embracing said blade and comb, and a spring plate swiveled on said cylindrical stem member for engaging parts of said clamp to resiliently connect the blade and comb together.

6. A shaving machine embodying, in combination, a blade-supporting member having a relative thick middle portion with an upper flat blade-supporting surface and an edge portion pointed and provided with teeth to form a comb portion having a top surface partly flat and partly beveled, a cylindrical stem member attached to and projecting from the bottom surface of said middle portion to produce a T-shaped structure and having an axial bore, a shaft disposed within said axial bore and passing through said supporting member, said shaft being provided at its lower end with means for engagement with a motor and having at its upper end a blade-reciprocating cam, said supporting member being provided with a flat blade-contacting surface and having a longitudinal depressed groove extending through said blade-contacting surface, a reciprocating member fitted in said groove and having an operative connection with said cam member, a cutting blade provided with a flat surface abutting the flat surface of said supporting member and comb portion and having an operative connection with said cam, said comb portion and blade having beveled edge portions disposed in a similar inclined plane, a clamp-plate embracing said blade and comb, and a spring plate swiveled on said cylindrical stem member for engaging parts of said clamp to resiliently connect the blade and comb together.

7. A shaving machine comprising, a manually supportable blade-supporting member having a body portion with a blade-supporting surface and an outwardly-projecting comb portion including serrations extending inwardly through a portion of said blade-supporting surface, a blade having a surface substantially complementary to and engaging said blade-supporting surface, the edge of said blade and said adjacent comb portion of said supporting member being normally maintained in engagement, the cutting edge of said blade having a series of serrations formed with cutting edges and adapted to cut upon lateral movement of said blade in relation to said comb portion, the outer surface of said blade adjacent its edge and the adjacent surface of said comb portion being shaped to form a skin-contacting surface which is continuous except for serrations thereof and adapted in the shaving operation to be pressed directly against the skin to be shaved, means for maintaining said members in co-operative relation, and power means for reciprocating said blade.

8. A shaving machine comprising, a manually supportable blade-supporting member having a body portion with a blade-supporting surface and an outwardly-projecting comb portion including serrations extending inwardly through a portion of said blade-supporting surface, a blade having a surface substantially complementary to and engaging said blade-supporting surface, a clamping member for maintaining the edge of said blade and said adjacent comb portion of said supporting member in engagement, the cutting edge of said blade having a series of serrations formed with cutting edges and adapted to cut upon lateral movement of said blade in relation to said comb portion, the outer surface of said clamping member adjacent its edge, the outer surface of said blade adjacent its edge, and the adjacent surface of said comb portion being shaped to form a skin-contacting surface which is continuous except for serrations thereof and adapted in the shaving operation to be pressed directly against the skin to be shaved, means for maintaining said members in co-operative relation, and power means for reciprocating said blade.

THADDEUS S. CASNER.